Oct. 30, 1962     J. VIRIOT ET AL     3,061,615
PROCESS FOR THE PRODUCTION OF ALPHA-EPICHLORHYDRIN
Filed April 16, 1957
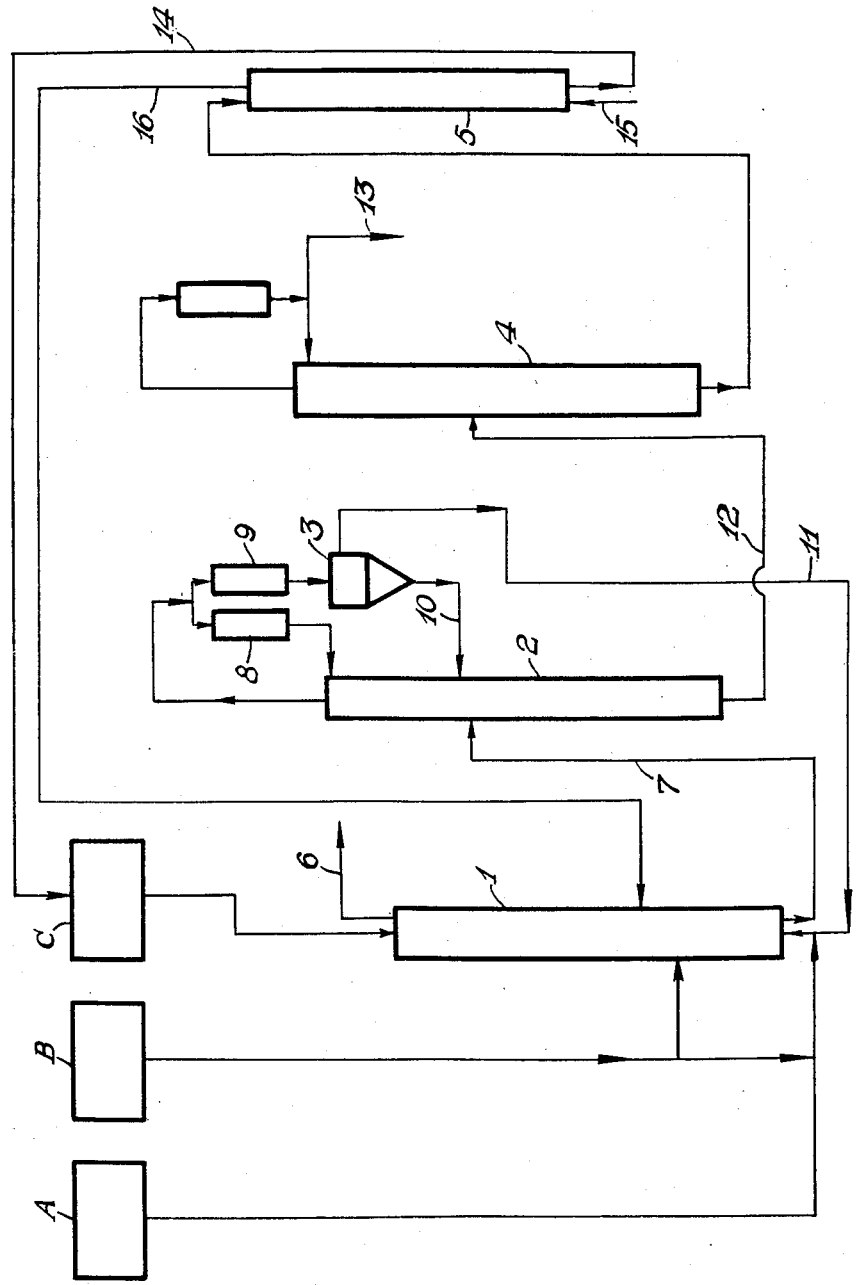

United States Patent Office 3,061,615
Patented Oct. 30, 1962

3,061,615
PROCESS FOR THE PRODUCTION OF
ALPHA-EPICHLORHYDRIN
Jacques Viriot and Hughes Pagniez, Tavaux-Cites, France, assignors to Solvay & Cie, Brussels, Belgium, a Belgian company
Filed Apr. 16, 1957, Ser. No. 653,241
Claims priority, application Belgium Apr. 30, 1956
6 Claims. (Cl. 260—348.6)

The present invention relates to a process for the production of alpha-epichlorhydrin by treating glycerol-dichlorhydrins with basic substances, particularly hydroxides or carbonates of alkali metals or alkaline earth metals.

It is known that the dehydrochlorination of glycerol-dichlorhydrins is accompanied by the saponification of a portion of the epichlorhydrin formed, leading to the formation of glycerol and thus substantially reducing the yield in epichlorhydrin.

In order to obviate this disadvantage, it has been proposed to remove the epichlorhydrin as and when it is formed by distilling the reaction mixture at such a rate that the vapours carried over contain not only epichlorhydrin, but also water and dichlorhydrins. From the condensed vapours the insoluble epichlorhydrin is isolated whilst the aqueous phase containing the unreacted dichlorhydrins is recycled to the dehydrochlorination apparatus.

The dehydrochlorination and the distillation are preferably effected in columns divided into compartments, or in tubular apparatus so as to obviate a continuous mixing of the reaction mass. On the other hand, high yields of epichlorhydrin are only obtained when effecting the distillation under reduced pressure.

It has now been found that epichlorhydrin may be produced in a continuous process by reacting a basic substance with an aqueous mixture of glycerol dichlorhydrins in the presence of a water-immiscible solvent for epichlorhydrin which circulates in counter-current to the aqueous phase whereby the epichlorhydrin is separated from the solvent outside the dehydrochlorination apparatus and the solvent is continuously recycled to the dehydrochlorination apparatus for a fresh extraction of epichlorhydrin.

All organic compounds which dissolve epichlorhydrin and are water-insoluble may be used as solvents according to the process of the invention. Solvents of this kind are for example hydrocarbons such as benzene, toluene, xylenes; halogenated hydrocarbons such as carbon tetrachloride, trichlorethylene, perchlorethylene, chloropropenes, chloropropanes, and more particularly 1,2,3-trichloropropane, chlorobutanes, chlorobenzenes; ether-oxides such as dibutyl or diamyl ether; ketones such as methylpropylketone, ethylpropylketone, amylmethylketone, 5-methylhexanone, amylethylketone, or esters such as alpha-methyl-propyl acetate, butyl or amyl propionate.

The dehydrochlorination and the continuous extraction of epichlorhydrin thus formed are preferably carried out in an extraction column having compartments, for example a Scheibel column containing consecutive compartments for decantation and agitation.

The introduction of the basic agent may be effected after mixing the requisite quantity with the dichlorhydrins in an aqueous medium, by simultaneous introduction with the latter, or by introduction at several points of the height of the dehydrochlorination apparatus so as to obviate too strong local concentrations of the basic agent which assist the hydrolysis of epichlorhydrin to form glycerol monochlorohydrin, glycidol or glycerol.

The attached drawing shows diagrammatically the production cycle of epichlorhydrin according to the process of the invention applied to the special case of a solvent which is heavier than water and whose boiling point is between that of epichlorhydrin and glycerol dichlorhydrins. Such a solvent is for example 1,2,3-trichloropropane, a by-product of the production of dichlorhydrins by hypochlorination of allyl chloride.

Into a column 1, having compartments, used as apparatus for the dehydrochlorination and extraction, there is introduced at the bottom the aqueous solution of glycerol dichlorhydrins from the tank A, and a portion of the basic agent in an aqueous solution from the tank B. The remaining basic agent required for the dehydrochlorination is introduced at an intermediate level of the column 1.

The solvent from the tank C is introduced at the top of column 1.

The epichlorhydrin is extracted as and when it is formed and is dissolved in the solvent. The unreacted dichlorhydrins are likewise dissolved in the organic solvent so that the aqueous phase leaving at the top of the extraction column at 6 practically contains only chloride and excess basic agent. The organic phase containing the solvent, epichlorhydrin, glycerol-dichlorhydrins and a little water is introduced through the pipe 7 into the distillation column 2 where it is subjected to drying by azeotropic distillation.

The epichlorhydrin and water leaving at the head of the column are condensed in the condensers 8 and 9. One portion flows back to the column, whilst the other is separated into two layers in the Florentine flask 3. The bottom layer formed by epichlorhydrin is returned to the column 2 through the pipe 10, whilst the top layer formed by water and some dissolved epichlorhydrin is returned through the pipe 11 to the dehydrochlorination and extraction column 1.

Since the aqueous solutions of dichlorhydrins obtained by hypochlorination of allyl chloride still contain a small amount of the latter compound, it is conducted to the head of the column 2 and may itself be used for the azeotropic removal of water. If desired, it is possible to add further quantities of allyl chloride or another azeotropic agent for removal.

The solution of epichlorhydrin and dichlorhydrins in the organic solvent is discharged through the pipe 12 into the distillation column 4 at the head of which epichlorhydrin is separated and removed from the cycle through the pipe 13.

The solvent collected at the bottom of the column 4 is freed from dissolved dichlorhydrins by treating with water in counter-current in the extraction column 5. The practically pure solvent is returned to storage through the pipe 14, whilst the aqueous solution of dichlorhydrins is returned through the pipe 16 into a compartment of the extraction column 1 where the dichlorhydrins concentration is approximately the same as that of the re-cycled solution.

The use of a solvent having a high boiling point has the advantage of avoiding the consumption of energy required for the evaporation of the solvent, the volume of which is usually large in relation to that of the solute.

However, when the boiling point of the solvent is comprised between that of epichlorhydrin and those of the dichlorhydrins, it may be important to rectify a portion of the solvent which is re-cycled at the top of the extraction column 1, and to re-introduce the remainder containing the dichlorhydrins at a carefully selected height of the extraction and dehydrochlorination column.

When using a solvent whose boiling point is below that of epichlorhydrin, for example carbon tetrachloride, the components of the organic phase may be separated by rectification.

If the solvent forms an azeotrope with epichlorhydrin the organic phase is subjected to rectification and the azeotropic mixture thus obtained at the head of the column is separated by extraction in the presence of a third solvent, for example water. This is particularly the case when the solvent is monochlorobenzene.

Generally speaking, the solution of epichlorhydrin and dichlorhydrins in any solvent may be treated with water to separate the solvent. This process may be of importance when it is desired to separate a portion of the total of the epichlorhydrin in the glycerol-monochlorohydrin state.

The following example is given for the purpose of illustrating the invention.

*Example*

Into a reactor formed by a seven tier extraction column, each tier comprising a compartment for decantation and a compartment for stirring, there are introduced at the bottom (first tier) 294 litres per hour of aqueous glycerol dichlorhydrins containing 0.316 mole per litre, i.e. 93 moles per hour.

This solution also contains sodium chloride at a concentration of 0.392 mole per litre, i.e. an addition of 144 moles per hour.

30 litres per hour of an aqueous solution of 5 N sodium hydroxide solution are introduced into the reactor, the distribution being 20 litres per hour at the first tier and 10 litres per hour at the third tier. At the head of the column there are introduced 56.3 litres per hour (78.4 kilograms per hour) of 1,2,3-trichloropropane.

The epichlorhydrin formed during the dehydrochlorination as well as a portion of the unreacted dichlorhydrins are absorbed by trichloropropane.

The residual water removed at the top of the column carries away 2.05 moles of glycerol, 3.8 moles of glyceroldichlorhydrins, 235 moles of sodium chloride and 59 moles of excess sodium hydroxide per hour.

The organic phase leaving the column through the pipe 7 contains epichlorhydrin and dichlorhydrins at a concentration of 0.111 and 0.050 mole per 100 grams of solvent respectively.

This solvent is dried in the distillation column 2 by the azeotropic removal of water by epichlorhydrin. The water which has dissolved some epichlorhydrin is re-cycled to the reactor through the pipe 11. The organic phase separated in the Florentine flask 3 is returned to the distillation column 2. At the bottom of this column the dry solvent is withdrawn from which the epichlorhydrin is separated by rectification in the column 4. 87 moles per hour of epichlorhydrin are continuously discharged at 13.

The solvent containing unreacted dichlorhydrins is treated in an extraction column 5 having four tiers and contacted in counter-current with a water supply of 150 litres per hour, the water being introduced at the bottom of the column at 15. The aqueous solution of dichlorhydrins at a concentration of 0.26 mole per litre is re-introduced into the extraction column 1 at the third tier.

Th yield in epichlorhydrin referred to dichlorhydrins is 93.5 percent of the theoretical.

We claim:

1. A process for the continuous production of alpha-epichlorhydrin by the reaction of a basic substance with an aqueous solution of a glycerol-dichlorhydrin, which comprises establishing a reaction-extraction zone having a first end and an opposite second end, continuously introducing the aqueous solution of said glycerol-dichlorhydrin at said first end of said zone, continuously introducing at least a portion of a basic substance selected from the group consisting of hydroxides and carbonates of metals selected from the group consisting of alkali metals and alkaline earth metals in an aqueous medium into said first end of said zone, continuously introducing into said second end of said zone a solvent for said alpha-epichlorhydrin which is water-immiscible and which is inert with respect to said glycerol-dichlorhydrin, said basic substance and said alpha-epichlorhydrin, and causing said water-immiscible solvent to flow continuously countercurrently to said aqueous solution of glycerol-dichlorhydrin and said aqueous basic substance throughout said zone, whereby the alpha-epichlorhydrin is dissolved in said solvent immediately upon being formed and is removed from contact with said alkaline substance which is retained in the aqueous medium with which said solvent in immiscible, continuously withdrawing said water-immiscible solvent from said first end of said zone, continuously withdrawing the aqueous medium contained in said zone from said second end of said zone, separating the epichlorhydrin from said solvent by vaporization exteriorly of said reaction-extraction zone and recycling said solvent separated from said epichlorhydrin to said second end of said zone for repeated passage from said second end to said first end of said zone.

2. A process for the continuous production of alpha-epichlorhydrin by the reaction of a basic substance with an aqueous solution of glycerol-dichlorhydrins as defined in claim 1, wherein said solvent for alpha-epichlorhydrin which is water-immiscible is 1,2,3,-trichloropropane.

3. A process for the continuous production of alpha-epichlorhydrin by the reaction of a basic substance with an aqueous solution of glycerol-dichlorhydrins as defined in claim 1, wherein additional quantities of said aqueous basic substance are introduced into said zone at at least one point intermediate said first end and said second end.

4. A process for the continuous production of alpha-epichlorhydrin by the reaction of a basic substance with an aqueous solution of a glycerol-dichlorhydrin, which comprises establishing a reaction-extraction zone having a first end and an opposite second end, continuously introducing the aqueous solution of said glycerol-dichlorhydrin at said first end of said zone, continuously introducing at least a portion of a basic substance selected from the group consisting of hydroxides and carbonates of metals selected from the group consisting of alkali metals and alkaline earth metals in an aqueous medium into said first end of said zone, continuously introducing into said second end of said zone a solvent for said alpha-epichlorhydrin which is water - immiscible and which is inert with respect to said glycerol-dichlorhydrin, said basic substance and said alpha-epichlorhydrin and causing said water-immiscible solvent to flow continuously countercurrently to said aqueous solution of glycerol-dichlorhydrin and said aqueous basic substance throughout said zone, whereby the alpha-epichlorhydrin is dissolved in said solvent immediately upon being formed and is removed from contact with said alkaline substance which is retained in the aqueous medium with which said solvent is immiscible, continuously withdrawing said water-immiscible solvent from said first end of said zone, continuously withdrawing the aqueous medium contained in said zone from said second end of said zone, separating the epichlorhydrin from said solvent by vaporization exteriorly of said reaction-extraction zone and by the addition of water, recycling said solvent separated from epichlorhydrin and said water to said second end of said zone for repeated passage from said second end to said first end of said zone and recycling said water to said first end of said zone.

5. A process for the continuous production of alpha-epichlorhydrin by the reaction of a basic substance with an aqueous solution of glycerol-dichlorhydrins as defined in claim 1, wherein said solvent has a lower boiling point than epichlorhydrin.

6. A process for the continuous production of alpha-epichlorhydrin by the reaction of a basic substance with an aqueous solution of glycerol-dichlorhydrins as defined in claim 1, wherein said solvent forms an azeotrope with epichlorhydrin.

References Cited in the file of this patent

UNITED STATES PATENTS

| | | |
|---|---|---|
| 2,070,990 | Groll et al. | Feb. 16, 1937 |
| 2,227,948 | Stein et al. | Jan. 7, 1941 |
| 2,314,039 | Evans et al. | Mar. 16, 1943 |

OTHER REFERENCES

Clarke et al.: Org. Syntheses, vol. 3, pages 47–49 (1923).